United States Patent [19]

Peters

[11] 4,062,559
[45] Dec. 13, 1977

[54] PAVER ATTACHMENT HITCH

[75] Inventor: Abram Peters, Belmont, Canada

[73] Assignee: Allatt Limited, Downsview, Canada

[21] Appl. No.: 720,497

[22] Filed: Sept. 3, 1976

[51] Int. Cl.² ............................................. B60D 1/00
[52] U.S. Cl. .................................. 280/460 R; 404/110
[58] Field of Search ........................... 280/460 R, 481;
404/110

[56] References Cited

U.S. PATENT DOCUMENTS

| 3,275,342 | 9/1966 | Layton | 280/481 X |
| 3,515,411 | 6/1970 | Layton | 280/481 X |

Primary Examiner—Joseph F. Peters, Jr.
Assistant Examiner—John A. Pekar

[57] ABSTRACT

Apparatus for effecting a push pull driving connection between a pair of vehicles disposed in tandem relation with one end of each vehicle juxtaposed relative to the other. The apparatus has a rocking beam mountable on the juxtaposed end of one vehicle for pivotal movement thereon in a horizontal plane. Bumper rollers are carried by and project from said rocking beam in axially horizontal orientation for rolling engagement with the proximal wheels of said other vehicle whereby movement of one vehicle towards the other will procure engagement of the bumper rollers with the wheels as aforesaid and upon continuation of such movement in the same general direction will transmit a pushing action to said other vehicle through the engagement of said bumper rollers with said wheels. A beam extender is at each end of said rocking beam and there is a coupling arm on each said beam extender for hooking engagement with a said proximal wheel. Each beam extender is movable between a retracted position, in which its coupling arm is disposed in engagement with a said proximal wheel, and a neutral position, in which said arm is disengaged and spaced from said wheel. A spacer interconnects said beam extenders and is operable to extend said arms into neutral position, and, thereafter, to retract them into pulling engagement with said wheels. The spacer is floating permitting lateral shifting of the beam extenders and coupling arms in unison without disengagement of said arms from said wheels while the beam extenders are in their retracted position.

12 Claims, 5 Drawing Figures

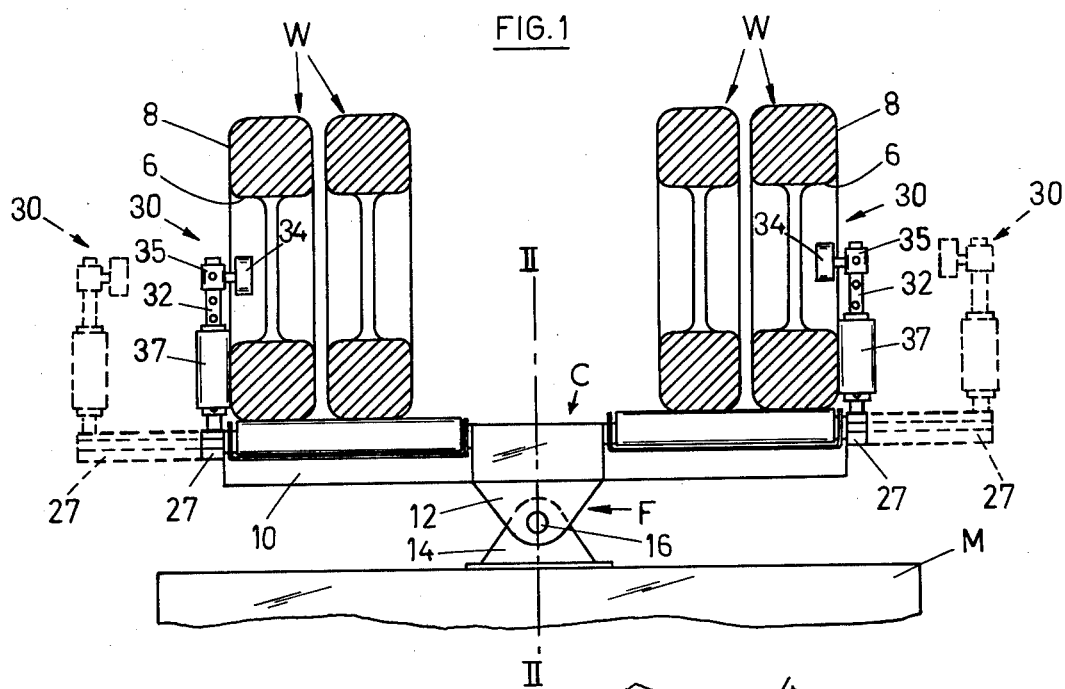
FIG.1
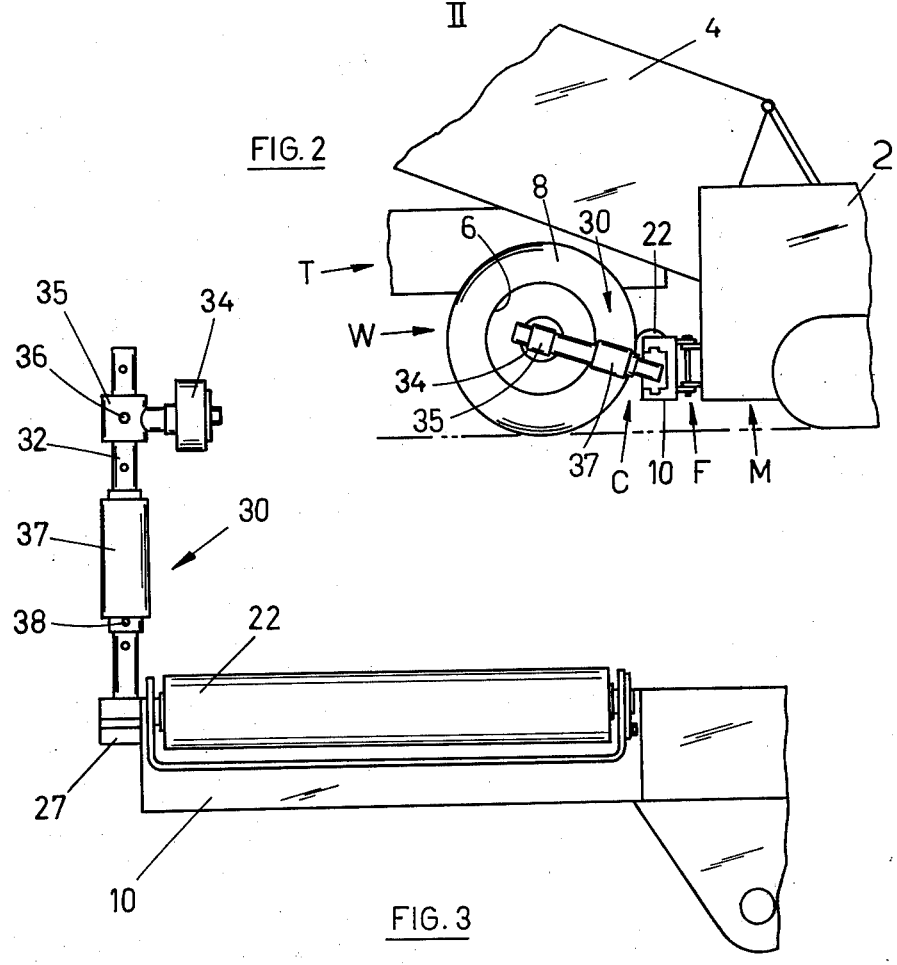
FIG.2
FIG.3

PAVER ATTACHMENT HITCH

This invention concerns apparatus for effecting a push-pull driving connection between a pair of vehicles disposed in tandem relation with one end of each vehicle juxtaposed relative to an end of the other for pushing or pulling purposes as the case may be.

Such apparatus is required, for example, for use with paving machines which traverse and lay paving material on roads, driveways and other like pavable surfaces. A common type of such paving machine has its own source of propulsion, and, while laying paving material, receives continuous replenishment thereof from a truck which it pushes ahead. In the situation visualized, the paving machine advances and lays paving material on the surface to be paved preceded by the truck which advances at the same rate of speed as the paving machine, continuously dropping paving material into the hopper of the paving machine.

The tandem relationship of the paving machine and the truck as described, is maintained by a hitch which is provided for releasably interconnecting them at their juxtaposed ends thereby ensuring that the paving material falls from the truck into the hopper of the paving machine. In addition and if necessary, said connection may also permit some towing of the paving machine by the truck.

To prevent undesired separation of the truck and the paving machine, the hitching apparatus mounted on the paving machine includes coupling arms extending therefrom for hooking engagement with the wheel rims of the truck enabling a pulling relationship to be established between the two vehicles. Each coupling arm is mounted on a beam extender, which is movable between a retracted position in which the coupling arm is disposed in hooking engagement with a proximal wheel of the truck and a neutral position in which it is disengaged and spaced from said wheel, so that the apparatus can be connected with or disconnected from the truck by the mere contraction or spreading of the coupling arms.

In practice, the path to be paved may not be straight and it is, hence, necessary that the connecting apparatus be capable of accommodating articulation and lateral displacement between the two vehicles, for example, when negotiating a curve. Known connecting apparatus is limited in this respect, and does not operate satisfactorily on relatively sharp curves which are sometimes encountered.

It is, therefore, a general object of the invention to provide connecting apparatus of this kind which has improved capability, as compared to known connecting apparatus, to accommodate articulation and lateral displacement between the two vehicles when interconnected and travelling in tandem along a tortuous path.

Other objects of the invention are to provide such apparatus which is simple to install; simple to operate; reliable in service and economical to manufacture.

According to the invention, the apparatus for interconnecting the two vehicles includes a rocking beam pivotably mountable on the juxtaposed end of one vehicle for pivotal movement thereon in a horizontal plane to accommodate articulation between it and the other vehicle.

The connecting apparatus may have a coupling assembly for quick mounting of said rocking beam on a vehicle, including alignable bearing or hinge members respectively attached to the rocking beam and to one of the aforesaid vehicles, and a pivot pin removably insertable into the aligned hinge members to interconnect them for swinging or pivotal movement relative to each other.

Bumper rollers in axially horizontal orientation are carried on and project from the leading edge of said rocking beam for rollable bumper engagement with the proximal wheels of the other vehicle so that, as the two vehicles close together, the bumper rollers will engage the wheels of the other vehicle, and one will push the other as facilitated by the engagement of said bumper rollers with the wheels. The bumper rollers may be disposed on each side of the rocking beam centre and, preferably, span a major portion of each such side; enabling the two vehicles to shift laterally of each other without disengagement of the bumper rollers and wheels.

Beam extenders in opposing relation carried by said rocking beams carry the coupling arms for hooking engagement with the proximal wheels of said other vehicle. Each beam extender is movable, in relation to the rocking beam and to the other beam extender, between a retracted position in which its coupling arm is disposed in engagement with a said proximal wheel, and an extended neutral position in which the arm is disengaged and spaced from said wheel.

The rocking beam may have spaced ways in which said beam extenders are relatively freely reciprocable between their neutral and retracted positions in order to accommodate the displacement of the two vehicles.

When the beam extenders are in retracted position, bringing the coupling arms into hooked engagement with the wheels of the other vehicle, the two vehicles will be permitted to pull apart to a limited extent only, but complete separation will be frustrated by the aforesaid engagement of the coupling arms with the wheels of the other vehicle. Conversely, separation of the vehicles is possible in the neutral position of the beam extenders when their respective coupling arms are outspread and hence disengaged from the wheels of said other vehicle.

The aforesaid beam extenders are disposed in opposed relation to each other for movement towards or away from each other or in unison with each other.

The connecting apparatus may include stops for limiting maximal extension of said beam extenders from said rocking beam and so to retain them on said rocking beam.

The coupling arms may project from the beam extenders in a direction away from the vehicle on which said rocking beam is mounted and each coupling arm may include a roller engageable with the rim of the proximal wheel on the other vehicle when the coupling arm is in a retracted position as described.

A spacing device or spacer interconnects said beam extenders and is selectively operable to extend them and to retract them whereby selectively to spread the coupling arms into their neutral positions or to retract them for hooking engagement with the wheels of said other vehicle.

The spacer may be located between the beam extenders and may be a fluid pressure-operated jack, or a hydraulic jack or other like expansion and contraction implement.

The spacer floats in relation to the rocking beam. That is to say, it is free to move as a unit in unison with said beam extenders and coupling arms as they shift location in response to the lateral displacement of the paving machine and the truck. Thus, such shifting becomes possible and practical without disengagement of the connecting apparatus from either vehicle, as will be understood.

In use, the connecting apparatus therefore provides a relatively large measure of articulation between the two vehicles interconnected thereby and permits their lateral displacement in relation to each other without disengagement. The apparatus can therefore be used reliably and advantageously by vehicles travelling along a tortuous path.

One embodiment of the present invention will now be described by way of example only with reference to the accompanying drawings, wherein:

FIG. 1 is a plan view of the connecting apparatus mounted on a paving machine and coupled to a supply truck;

FIG. 2 is a side view of the connecting apparatus joining supply truck and paving machine;

FIG. 3 is a plan view of one side of the connecting apparatus;

Figure 5:
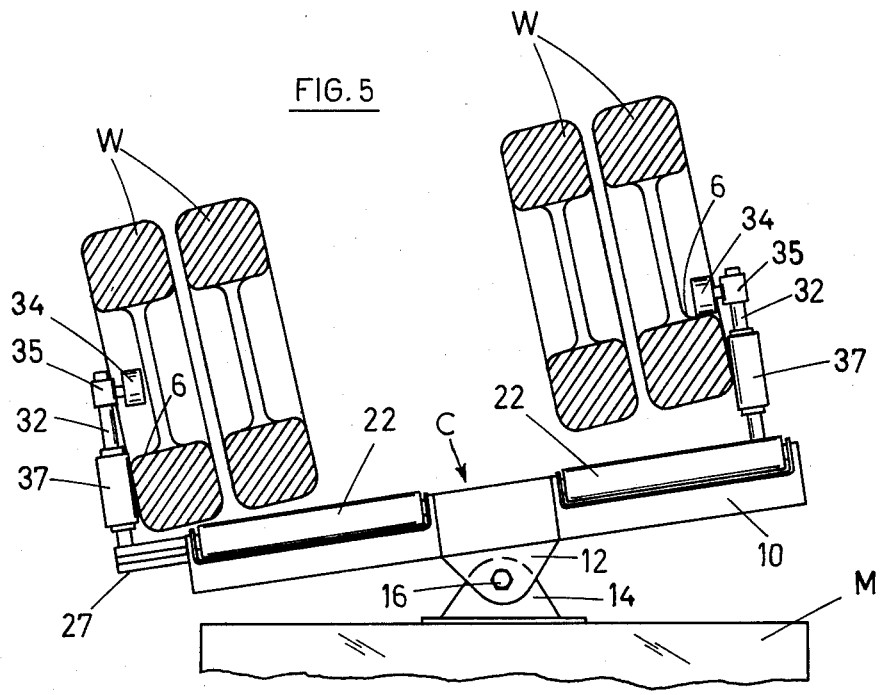
FIG. 5 is a plan view similar to FIG. 1 but showing the manner in which the connecting apparatus functions when the paving machine and supply truck are negotiating a left hand curve and the supply truck is displaced laterally to the left of centre of the rocking beam.

In this embodiment, connecting apparatus C is mounted on and effects a driving connection between a paving machine M which acts herein as a pushing vehicle, and a supply truck T, which is the pushed, and sometimes pulling, vehicle. Since the paver M and truck T are known, per se, they will be described only briefly to the extent necessary to explain the present invention.

The paving machine (only the front portion whereof is shown) herein visualized is self-propelled and carries a hopper 2 from which paving material is spread onto the road surface to be paved and levelled thereon as and while the paving machine traverses the said road surface. The supply truck T (the rear portion only whereof is herein shown) has rear wheels W at each side. The truck T which precedes paving machine M has a tip-up body 4 which it tiltable as shown in FIG. 2 to dump paving material into the paver hopper 2 during the traversal of the road surface. The rear wheels W of the truck T have conventional broad rims 6 on which its tires are mounted as best shown in FIG. 1.

The connecting apparatus C includes the rocking beam 10 mountable on the leading end of the paving machine M for see-saw movement thereon in a horizontal plane.

The rocking beam 10 may be attached to paving machine M by means of a hinge and fulcrum assembly F which consists in this example, of two hinge elements 12-14 releasably interconnectable by a hinge pin 16 installable in bearing holes 18 formed in the hinge elements 12 and 14. In this example, hinge element 12 is attached to the rocking beam 10 and companion hinge element 14 is attached to the paving machine M; hinge pin 16 being inserted in the aligned bearing holes 18 for interconnecting said hinge elements 12-14; said hinge pin 16 being removable for detaching the connecting apparatus C from the paving machine M.

Bumper rollers 22-22 are carried on and project from the leading edge of rocking beam 10 so as to constitute the foremost parts thereof. They are disposed on each side of centre line II—II of the rocking beam 10 and span a major portion of each such side. Each of said bumper rollers 22-22 is mounted on a shaft 24 suitably secured to said rocking beam 10. It will be obvious that said bumper rollers 22-22 are positioned to engage and push truck wheels W when the corresponding ends of truck T and paving machine M are juxtaposed, as in FIGS. 1 and 2, for example.

A beam extender 27 is located on each side of the rocking beam centre line II—II and each is reciprocable on the beam 10. The beam extenders 27-27 may be guided as in ways 28-28 on the rocking beam 10 in which they are slidable or otherwise movable towards or away from each other or co-directionally in unison with each other.

The actual interconnection of the two vehicles is effected by the pair of coupling arms 30-30 respectively extending from beam extenders 27-27 and each said coupling arm 30 is comprised of an elongated shaft 32 which is rooted by one end in beam extender 27 and carries a roller 34 at its other end for hooking into engagement with the rim 6 of the wheel W. Roller 34 is carried on a bushing 35 which is selectively securable to shaft 32 by pin 36 in an understood manner. The intermediate position of shaft 32 is also protected against abrasive contact with wheel 6 by a roller 37 which is rotatable on shaft 32 and relocatably secured thereto by pin 38 in a known manner.

Some comment should, perhaps, be made at this juncture concerning the length of arm 32 and its forward extent from beam extender 27.

As already been indicated, and as will be apparent from FIG. 2 the function of truck T is to replenish paving material dispersed by paver M and, for this purpose, the truck T must always be constantly maintained in dumping communication with paver M while paving operations are in progress. In turn this limits the extent to which truck T can safely pull ahead of paver M since excessive separation of the two vehicles will obviously cause the paving material dumped by truck T to miss hopper 2 and land on the ground.

It is for this reason that the invention makes provision for bushing 35 to be secured to elongated shaft 32 at preferred locations which will in turn affect and limit the separable extent of the two vehicles. Thus, by pinning bushing 35 on shaft 32 closer to beam extender 27, the effective length of arm 30 is shortened; whereas it can be lengthened, in turn, by locating bushing 35 on shaft 32 farther from beam extender 27.

It will be understood, of course that the minimum extension of coupling arm 30, — by which is meant the advancement of bushing 35 towards the free end of shaft 32 — is governed by several variable considerations.

Primary consideration must, of course, be given to the physical proportions of truck T and paver M and to the rearward extend of truck body 4 behind truck T. The diameters of wheel W with and without tires is also pertinent. At all events it will be appreciated, likewise, that the degree of articulation or angular displacement of the two vehicles contemplated by the present invention is dependent to some extent upon the effective length of arms 30-30.

To assess the optimum length of arms 30 between beam extenders 27 and wheel engaging rollers 34, it is necessary, therefore, to take into account the relative physical proportions of truck T and paver M as well as the articulation required between these two vehicles.

Figure 4:
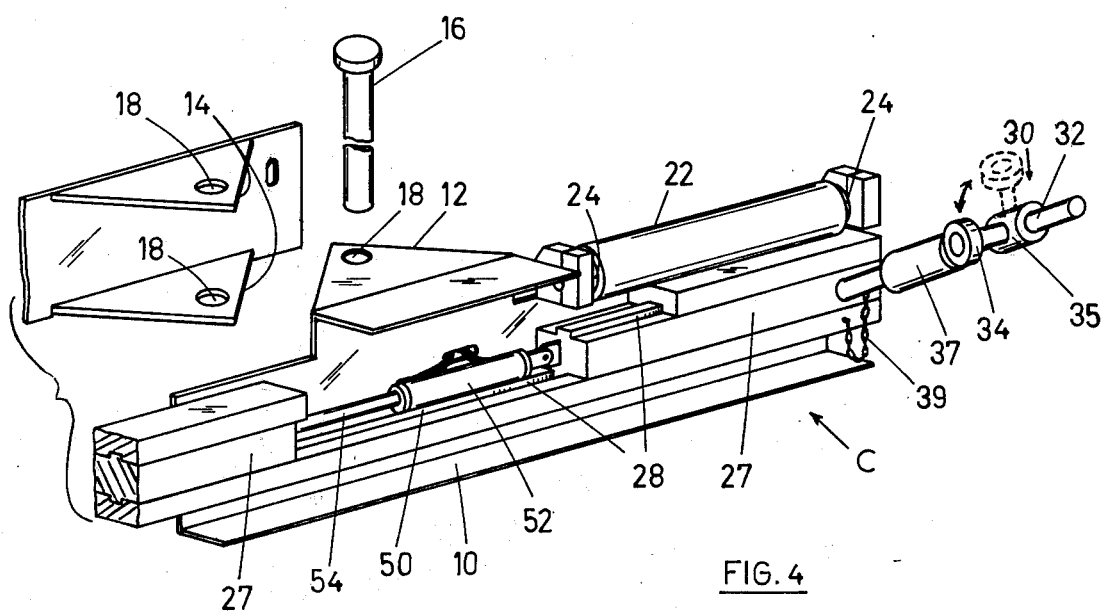
FIG. 4 is a perspective view of the connecting apparatus from above and one side.

Bushing 35 may also be rotatable on shaft 32 to assume the neutral position shown in dotted lines in FIG. 4 in which associated roller 34 is turned away to render it incapable of engaging wheel W.

Preferably the maximal extension of beam extenders 27-27 can be limited by stops. One suitable stop may comprise a chain 39 linking each beam extender 27 to its respective side of rocking beam 10; the length of each chain being chosen to permit adequate extension of its associated beam extender 27 relative to a wheel W of a truck yet prevent said beam extender 27 from becoming totally disengaged from the way 28 which it is guided.

The two beam extenders 27-27 are interconnected by a spacer 50 which is operable to retract or spread them for engagement or disengagement with the wheels W of the truck as described.

Said spacer 50 is an expandible and contractible device such as the axial pump illustrated in FIG. 4 comprising cylinder 52 and piston rod 54 respectively interconnected with and supported by the beam extenders 27-27. As will be obvious, said spacer 50 is not only operable to move the beam extenders 27-27 towards and away from each other but it can, of course, be also used to dispose the beam extenders 27-27 at a fixed separation which is maintained while they move in unison (with spacer 50) to permit misalignment of the two vehicles as shown in FIG. 5.

In the use of the connecting apparatus, the paving machine M is positioned in tandem with the paving maching M, on which the connected apparatus C is mounted and rear end of truck T being in juxtaposition. The spacer 50 is operated to spread the beam extenders 27-27 and their coupling arms 30-30 into the neutral wheel receiving position indicated in dotted lines in FIG. 1 in which they encompass the rear wheel W of the supply truck T; the spacer being then operated to retract beam extenders 27-27 and, thus, their coupling arms 30-30 into the retracted position, shown in solid lines in FIG. 1, in hooking engagement with the wheel W of the truck T. When thus disposed, each side roller 37 engages the sidewall of the tire 8 on a wheel W and roller 34 at the end of coupling arm 30 is in hooking engagement with the wheel rim 6 of the same wheel W.

As already observed, the coupling arms 30-30 and their respectively associated beam extenders are maintainable by spacer 50 in the retracted position described — hence, in engagement with truck wheels W-W — by spacer 50 notwithstanding that the alignment of paving machine M and truck T may vary (within limits) during the paving operation. The two vehicles may thus be constantly maintained in juxtaposition ensuring that the paving material dropping from truck T will land in the paver hopper 2 while the vehicles are so engaged.

In the situation illustrated in FIG. 5 the truck T has turned to the left. This has resulted in the wheel W on the right hand side of the truck T moving out of contact with the right hand bumper roller 22 and into hooked engagement with the coupling arm 30 on the same side. At the same time the rocking beam 10 has swung to the left to accommodate articulation between the truck T and the paving machine M.

If while travelling straight or turning as indicated in FIG. 5, the truck T tends to move laterally relative to the paving machine M the beam extenders 27-27 and coupling arms 30-30 will move in unison to follow the truck wheels W without disengagement of the wheels W of the Truck T.

During this turning motion and lateral movement, the rollers 37-37 remain in engagement with their respectively adjacent tires 8.

After the paving operation is finished the truck T can be released from the connecting apparatus C by operating the spacer 50 to spread the beam extenders 27-27, and thus the coupling arms 30-30 are moved laterally outwardly away from each other disengaging from the wheels W of the truck T; the truck T and paving machine M being then disconnected from each other.

The connecting apparatus C can be bodily removed from the paving machine M by the simple withdrawal of the hinge pin 16 from the fulcrum assembly F.

Various modifications to the described embodiment, within the scope of the invention will be apparent to those skilled in the art, the scope of the invention being defined in the appended claims.

What I claim is:

1. Apparatus for effecting a push-pull driving connection between a pair of vehicles disposed in tandem relation with one end of each said vehicle juxtaposed relative to the other, comprising;

a rocking beam pivotably mountable on the juxtaposed end of one said vehicle for pivotal movement thereon in a horizontal plane;

bumper rollers carried by and projecting from said rocking beam in axially horizontal orientation for rolling engagement with the proximal wheels of said other vehicle whereby movement of one vehicle towards the other will procure engagement of the bumper rollers with the wheels as aforesaid, and, upon continuation of such movement in the same general direction, will transmit a pushing action to said other vehicle through the engagement of said bumper rollers with the said wheels;

beam extenders in opposed relation to each other carried by said rocking beam for movement laterally of said rocking beam;

a coupling arm projecting from each said beam extender for hooking engagement with a said proximal wheel;

each said beam extender being movable between a retracted position in which the coupling arm carried thereby is disposed in engagement with a said proximal wheel and a neutral position in which said arm is disengaged and spaced from said wheel; and, a spacer interconnecting said beam extenders and operable to extend said arms into neutral position, and, thereafter, to retract them into pulling engagement with said wheels and to releasably maintain them at a fixed separation;

said spacer being floating relative to said rocking beam for permitting lateral shifting of said beam extenders and coupling arms on said rocking beam in unison with each other and with the spacer without disengagement of said arms from said wheels while said beam extenders are in their retracted position.

2. Apparatus according to claim 1 including a fulcrum assembly for mounting said rocker beam on a vehicle, said fulcrum assembly including a pair of hinge members respectively attached to said rocker beam and to said vehicle and a hinge pin removably insertable into said hinge members for releasably interconnecting them.

3. Apparatus according to claim 2 including spaced ways on said rocking beam with which said beam extenders are movably engaged and in which they are guided between neutral and retracted positions.

4. Apparatus according to claim 3 wherein said bumper rollers are disposed on each side of centre of said rocking beam and span a major portion of each said side.

5. Apparatus according to claim 4 wherein said beam extenders are disposed in coaxial alignment with each other.

6. Apparatus according to claim 4 wherein each said coupling arm projects away from the vehicle on which said rocking beam is mounted and includes rollers engageable with the proximal wheel on the other vehicle when the said coupling arm is retracted as aforesaid into hooking engagement with said wheel.

7. Apparatus according to claim 6 including stops for limiting extension of said beam extenders on said rocking beam.

8. Apparatus according to claim 4 including stops for limiting extension of said beam extenders on said rocking beam.

9. Apparatus according to claim 2 wherein said spacer is disposed between said beam extenders.

10. Apparatus according to claim 9 wherein said spacer includes a fluid pressure operated jack.

11. Apparatus according to claim 1 wherein:

said bumper rollers are disposed on each side of centre of said rocking beam and span a major portion of each said side; and each side beam extender is coaxially aligned with each other; and each said coupling arm is attached by one end to its respective beam extender, and projects away from the vehicle on which said rocking beam is pivotably mounted and includes rollers engageable with said proximal wheels on the other vehicle when the said coupling arm is retracted as aforesaid into hooking engagement with said wheel; and said rocking beam has spaced ways with which said beam extenders are movably engaged and in which they are guided between neutral and retracted positions; and said spacer includes a fluid operated jack and is disposed between said beam extenders; and said apparatus includes stops for limiting maximal extension of said beam extenders from said rocking beam.

12. Apparatus according to claim 11 wherein said apparatus includes a fulcrum assembly for mounting said rocking beam on a vehicle;

said fulcrum assembly includes a hinge member attached to said rocking beam, a hinge member attachable to one of the aforesaid vehicles, and a hinge pin removably insertable into said bearing for pivotably interconnecting them.

* * * * *